(No Model.)
J. BIRD.
PLUNGER FOR WORKING BARRELS OF PUMPS.
No. 464,418. Patented Dec. 1, 1891.
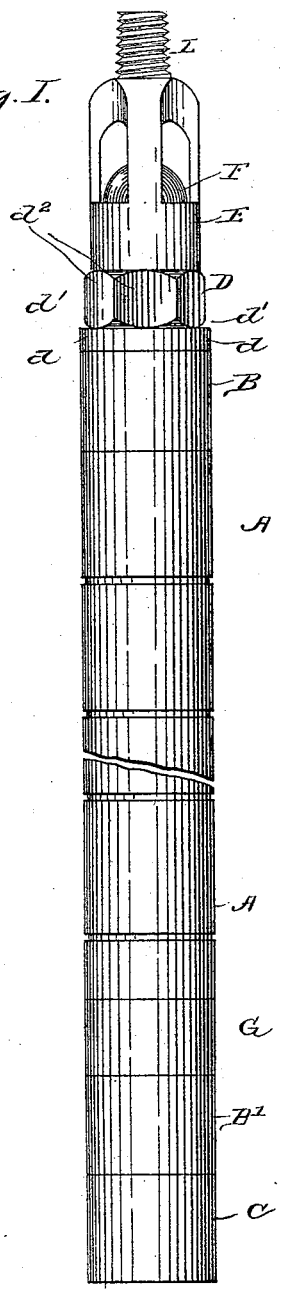
Fig. I.
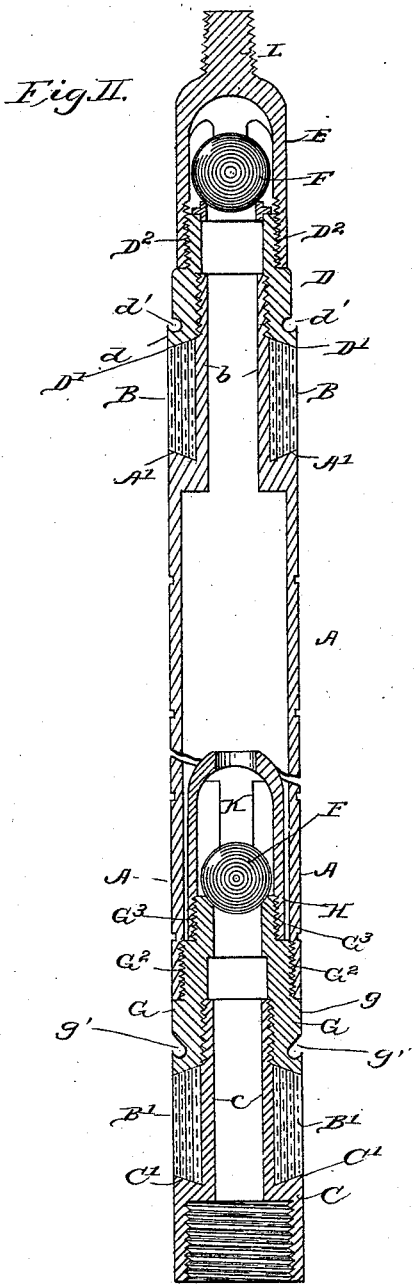
Fig. II.
WITNESSES:
Ben R. Hagar
H. H. Locke
INVENTOR
John Bird
BY Knight Bros.
ATTORNEY

UNITED STATES PATENT OFFICE.

JOHN BIRD, OF BRADFORD, PENNSYLVANIA, ASSIGNOR OF ONE-HALF TO HENRY H. LOCKE, OF SAME PLACE.

PLUNGER FOR WORKING BARRELS OF PUMPS.

SPECIFICATION forming part of Letters Patent No. 464,418, dated December 1, 1891.

Application filed March 23, 1891. Serial No. 386,123. (No model.)

*To all whom it may concern:*

Be it known that I, JOHN BIRD, a citizen of the United States, residing at Bradford, in the county of McKean and State of Pennsylvania, have invented certain new and useful Improvements in Plungers for Working Barrels of Pumps, of which the following, taken in connection with the accompanying drawings, is a full, clear, and exact specification.

The object of my invention is to provide the working barrel with a plunger which will fit very tightly therein and at the same time will produce but a minimum amount of friction and wear, thus obtaining a maximum amount of suction with the expenditure of but a slight increase of power.

The invention consists of certain features of novelty hereinafter described, and particularly pointed out in the claims.

Referring now to the said drawings, Figure I is a side elevation of my improved plunger, the middle portion thereof being broken away; and Fig. II is a similar view in vertical section.

The shell or hollow body A of the plunger is provided at its upper end with a neck or stem $b$, over which an elastic or fibrous packing B is fitted. This packing is beveled at its edges or ends, as shown in Fig. II, forming in cross-section an inwardly-projecting dovetail, and the shoulder at the junction of the neck $b$ and shell A is correspondingly beveled, so as to form a seat for and to hold in place the lower end of the packing. The upper end of the neck $b$ is provided with a thread, as shown in cross-section, upon which is fitted a jam-nut D, whose under side is beveled to correspond to the bevel of the upper edge of the packing over which the edge of the said nut fits. By this arrangement it will be seen that the packing is securely held in place and may have its horizontal diameter readily increased for compensating for wear by simply screwing the nut D downward. The lower end of the shell A is provided with a female screw, into which is inserted a threaded portion $g^2$ of a nut G, and into this nut G is screwed the threaded end of a neck or stem $c$, projecting upwardly from the bottom tube C of the plunger. The lower end of the nut G is beveled similarly to the lower end of the nut D, and the tube C where it joins the neck $c$ is also provided with a beveled shoulder C' similar to the shoulder A'. A packing B', having upper and lower beveled edges or ends, is also fitted on the neck $c$, and is held in place and adjusted by means of the shoulder C' and bevel-ended nut G in the manner described in connection with the upper packing B. The nuts D G each have cylindrical portions $d\ g$, respectively, equal in diameter to the diameter of the shell A, in which portions $d\ g$ are formed inwardly and downwardly projecting annular grooves or chambers $d'\ g'$, respectively, for catching and retaining any sand or grit that may get into the working barrel, thus preventing the same from wearing away the contacting-surfaces of the barrel and plunger, the upper chamber $d'$ being formed just below the wrench-faces $d^2$ of the nut D, where the nut is of less diameter, thus better adapting the chamber $d'$ for the purpose described. The chambers $d'\ g'$ are circular in cross-section, as shown, so that they may be readily cleaned of dirt and rust. The upper end of the nut D is provided with a threaded neck $D^2$, on which the valve-cage E is screwed, and the said valve-cage is provided at its upper end with a threaded stem L for the attachment of the plunger-rods. (Not shown.) The nut G is provided above its threaded portion $G^2$ with a threaded neck H, on which is screwed the lower valve-cage K, the ends of the said necks $D^2$ G being provided with seats for the valves F.

Having thus described my invention, what I desire to secure by Letters Patent is—

1. In a plunger, the combination, with the shell or body A, having the stem $b$ and beveled shoulder A', of a bevel-ended packing-ring on said stem, a jam-nut on said stem having a beveled end adapted to be screwed down on said packing, said nut having the threaded neck $D^2$ provided with a valve-seat, and the valve-cage fitting on the neck $D^2$ and having the stem L, substantially as set forth.

2. In a plunger, the combination, with the shell A, having the threaded neck $b$ and beveled shoulder A' at its upper end and the female screw at its lower end, of the bevel-ended packing B, the bevel-ended jam-nut D, fitting on the neck $b$ and having the threaded neck $D^2$ and valve-seat, the cage E, fitting on said neck $D^2$, the bottom tube C, having the threaded stem $c$ and beveled shoulder C', the jam-nut G, screwed into the lower end of the casing A and having the threaded neck $G^3$, the valve-cage K, screwed on the neck $G^3$, and the bevel-ended packing-ring B' on the stem C, each of said jam-nuts being provided with an inwardly and downwardly projecting grit-chamber, substantially as set forth.

JOHN BIRD.

Witnesses:
J. E. THOMAS,
H. H. LOCKE.